(12) United States Patent
McCallister

(10) Patent No.: US 7,978,749 B2
(45) Date of Patent: Jul. 12, 2011

(54) BANDJAMMING MULTI-CHANNEL DSSS TRANSMITTER AND METHOD THEREFOR

(75) Inventor: Ronald Duane McCallister, Scottsdale, AZ (US)

(73) Assignee: Crestcom, Inc., Scottsdale, AZ (US)

( * ) Notice: Subject to any disclaimer, the term of this patent is extended or adjusted under 35 U.S.C. 154(b) by 1032 days.

(21) Appl. No.: 11/777,881

(22) Filed: Jul. 13, 2007

(65) Prior Publication Data

US 2009/0016411 A1    Jan. 15, 2009

(51) Int. Cl.
  *H04B 1/00*    (2006.01)
(52) U.S. Cl. .......................... 375/146; 375/140
(58) Field of Classification Search .................. 375/146
  See application file for complete search history.

(56) References Cited

U.S. PATENT DOCUMENTS

| | | | |
|---|---|---|---|
| 6,373,861 B1 | 4/2002 | Lee | |
| 6,870,826 B1 | 3/2005 | Ishizu | |
| 7,215,635 B2 | 5/2007 | Song et al. | |
| 2002/0085647 A1* | 7/2002 | Oishi et al. | 375/297 |
| 2009/0122840 A1* | 5/2009 | Quagliaro | 375/146 |

OTHER PUBLICATIONS

Behrouz Farhang-Boroujeny, "A Square-Root Nyquist (M) Filter Design for Digital Communication Systems", Submitted to IEEE Transactions on Signal Processing, May 2006.

F. Harris, et al., "An Improved Square-Root Nyquist Shaping Filter", SDR '05, Nov. 14-18, 2005, Orange County, CA.
Tauseef Afzal, "Multi-Carrier CDMA & FLASH-OFDM", Seminar on Topics in Communications Engineering, Munich University of Technology, Winter Semester 2005/06.
Tim Davidson, "Efficient Design of Waveforms for Robust Pulse Amplitude Modulation", McMaster Optimization Seminar Series, pp. 1-33, Department of Electrical and Computer Engineering, McMaster University, Hamilton, Canada, 2002.
Ken Gentile, "The care and feeding of digital, pulse-shaping filters", RF Design, pp. 50-61, Apr. 2002.
"OFDM and Multi-Channel Communication Systems", National Instruments Tutorial Document, Feb. 1, 2006.

* cited by examiner

*Primary Examiner* — David C Payne
*Assistant Examiner* — Erin M File
(74) *Attorney, Agent, or Firm* — Meschkow & Gresham, P.L.C.

(57) ABSTRACT

A direct sequence spread spectrum (DSSS) transmitter (12) is configured to form "N" multiple excess-bandwidth channels (44) in an allocated bandwidth (54), where N is an integer. Each excess-bandwidth channel (44) includes a lower rolloff band (40), a minimum-bandwidth channel (38), and an upper rolloff band (42). The N excess-bandwidth channels (44) are placed in the allocated bandwidth (54) so that two of the rolloff bands (40, 42) reside within allocated bandwidth 54 and outside all of minimum-bandwidth channels 38 and so that N−2 of the rolloff bands (40, 42) predominately reside within adjacent minimum-bandwidth channels (38). The excess-bandwidth channels (44) substantially conform to EV-DO standards, and four of the excess-bandwidth channels (44) are supported for each 5 MHz of allocated bandwidth (54).

20 Claims, 8 Drawing Sheets

BANDJAMMING MULTI-CHANNEL DSSS TRANSMITTER AND METHOD THEREFOR

TECHNICAL FIELD OF THE INVENTION

The present invention relates generally to the field of radio-frequency (RF) communications. More specifically, the present invention relates to direct sequence spread spectrum (DSSS) communication systems in which multiple DSSS frequency channels are communicated in a continuous band of spectrum.

BACKGROUND OF THE INVENTION

Cellular and other data communication service providers operate in accordance with communication standards. Often, communication standards are adopted only after difficult and lengthy negotiations and design efforts by competing interests who are technically knowledgeable about a variety of potential, realizable communication schemes. After a hard-fought standard is eventually adopted, service providers and their customers then procure, install, and operate a vast amount of expensive equipment conforming to the standard.

But as technical capabilities evolve, standards become outdated. A need exists to gracefully migrate from an older standard which is supported by an entire infrastructure of service-provider and user equipment to a newer standard. A graceful migration should support newer equipment that may provide enhanced communication services in accordance with a newer standard as such equipment becomes available while also supporting a population of legacy equipment that complies with an older standard.

One family of communication standards that has been successful in recent years was ratified by the International Telecommunication Union (ITU) and given the designation "IS-856". This standard is concerned with wideband, wireless data communications, and has been associated with a variety of common names including: CDMA2000, Evolution-Data Only, Evolution-Data Optimized, EV-DO, EVDO, 1xEV-DO, and the like. This family of standards has successfully evolved from a "Rev-0" revision, through a "Rev-A", a "Rev-B", and a "Rev-C" revision. Future revisions may revise the family of standards even further.

The EV-DO standards define spread spectrum communication schemes. The different revisions of the EV-DO standards provide for higher data rates primarily by accommodating parallel operation of multiple EV-DO channels. But the basic definition of an EV-DO channel remains essentially as originally envisioned so that legacy equipment is supported for graceful transitions to newer standards. Some of the basic characteristics of an EV-DO channel are a chip rate of 1.288 mcps and an excess-bandwidth factor "a" of about 1.22, resulting in a bandwidth requirement of around 1.5 MHz for a single EV-DO channel. The later revisions define how to operate multiple ones of these EV-DO channels in parallel so that increased data rates result. The later revisions contemplate operating EV-DO channels in parallel over up to a 20 MHz bandwidth, and the 20 MHz need not be provided in a contiguous band.

The goal of any communication system, including systems operated in accordance with the EV-DO standards and those operated in accordance with competing standards, is to communicate the most data possible, after identifying and correcting errors, using the least amount of bandwidth while adhering to regulatory and power consumption constraints. A communication system should use its allocated bandwidth as efficiently as possible to accomplish this goal. But conventional communication systems operated in accordance with the later revisions of the EV-DO standards tend use their bandwidths inefficiently.

Historical precedence and practicality has led to regulatory allocation of bandwidth in integral multiples of 5 MHz in the region of the electromagnetic spectrum where EV-DO and competing systems operate. While 1.25 MHz and 2.5 MHz contiguous bands might possibly be allocated, contiguous bands of 5 MHz are commonly allocated, with the occasional contiguous band of up to 20 MHz being allocated from time-to-time and location-to-location.

FIG. 1 shows a representative conventional allocation of a 5 MHz contiguous frequency band, shown as extending from −2.5 MHz to +2.5 MHz, for use by three EV-DO channels. The 5 MHz contiguous band is not efficiently used by three EV-DO channels, which each require its own approximately 1.5 MHz bandwidth. Some portions of the 5 MHz channel are not carrying any appreciable amount of energy that may be otherwise used to communicate data. In other words, the conventional allocation can communicate no more data through a 5 MHz contiguous frequency band than it could through a 4.5 MHz contiguous band or through three non-contiguous 1.5 MHz bands. A need exists for a better match between EV-DO channel bandwidth requirements and the actual amounts of contiguous bandwidths that tend to be allocated by regulatory agencies.

Communication schemes that compete with the EV-DO family of communication standards are better able to efficiently utilize differing amounts of allocated bandwidths. Such schemes are often based on orthogonal frequency division multiplex (OFDM) techniques. OFDM better utilizes diverse bandwidths by subdividing a given allocated bandwidth into a multiplicity of sub-channels, wherein the sub-channels avoid the insertion of inefficient frequency guard bands by adhering to an "orthogonality" constraint. But OFDM techniques utterly fail to support an existing population of legacy equipment that complies with EV-DO standards. Likewise, hybrid OFDM/CDMA communication schemes have been proposed that may better utilize diverse bandwidths than conventional EV-DO communication systems can. But, such communication schemes also utterly fail to support an existing population of legacy equipment that complies with EV-DO standards.

Accordingly, a need exists for communication system components and for a method of operating communication system components that support the efficient use of multiple EV-DO channels in the bandwidths that are typically allocated by regulatory agencies.

SUMMARY OF THE INVENTION

It is an advantage of at least one embodiment of the present invention that an improved bandjamming multi-channel direct sequence spread spectrum (DSSS) transmitter and method are provided.

Another advantage of at least one embodiment of the present invention is that a number of EV-DO channels placed in a bandwidth of a size commonly allocated by a regulatory agency is selected to efficiently utilize the allocated bandwidth.

Another advantage of at least one embodiment of the present invention is that EV-DO channels are placed in an allocated bandwidth so as to overlap one another, and DSSS principles are applied to minimize the resulting co-channel interference.

These and other advantages are realized in one form by a multi-channel, direct sequence spread spectrum (DSSS)

transmitter configured to efficiently utilize a contiguous region of spectrum having an allocated bandwidth. The transmitter includes a multi-channel DSSS modulator configured to generate a plurality of DSSS chip streams. A multi-channel, pulse-shaping filter is configured to respectively transform the plurality of DSSS chip streams into a plurality of filtered DSSS chip streams. Each of the filtered DSSS chip streams is configured by the filter to spectrally occupy a minimum-bandwidth channel, an upper rolloff band, and a lower rolloff band. A frequency multiplexer is configured to respectively up-convert and combine the plurality of filtered DSSS chip streams into a multi-channel signal confined within the allocated bandwidth so that: A) a lower rolloff band for a first one of the minimum-bandwidth channels and an upper rolloff band for a last one of the minimum-bandwidth channels reside inside the allocated bandwidth and outside all of the minimum-bandwidth channels, and B) all rolloff bands other than the lower rolloff band for the first minimum-bandwidth channel and the upper rolloff band for the last minimum-bandwidth channel predominately reside within adjacent ones of the minimum-bandwidth channels.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 2:
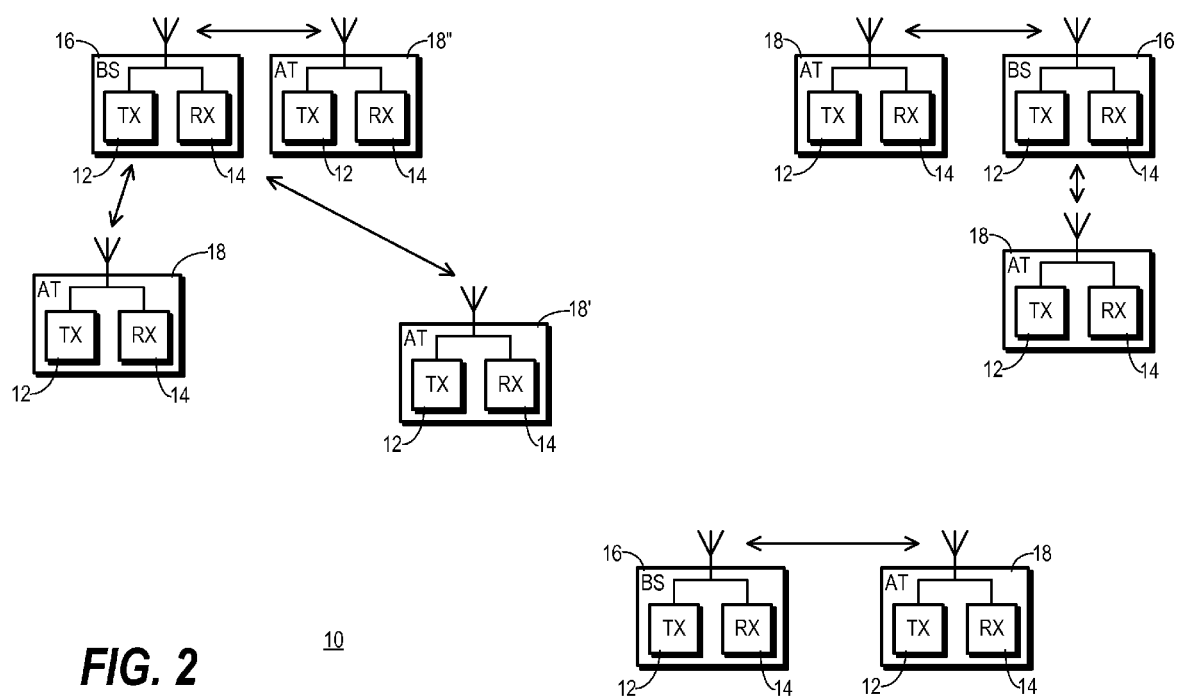
FIG. 2 schematically shows an exemplary communication system in which geographically spaced apart base stations communicate with a population of geographically dispersed access terminals.

FIG. 2 schematically shows an exemplary communication system 10 within which one or more transmitters 12 and receivers 14 configured in accordance with the teaching of the present invention may operate. In communication system 10, geographically spaced apart base stations 16 communicate with a population of geographically dispersed access terminals 18. Each base station 16 and each access terminal 18 may include both a transmitter 12 and a receiver 14. Base stations 16 may be maintained at fixed, locations, while access terminals 18 may be either stationary or mobile, but these are not requirements.

On average, each base station 16 controls and supports communications with those access terminals 18 that are closest to it at any given moment. In communication system 10, communications take place using an allocated bandwidth located in an assigned section in the electromagnetic spectrum. This bandwidth and section are typically allocated and assigned by a regulatory agency as either licensed or unlicensed spectrum. By convention and historical practice, the allocated bandwidth is an integral multiple of 5 MHz. One of the goals of communication system 10 is to efficiently use allocated bandwidth configured as an integral multiple of 5 MHz.

Challenges arise when a far access terminal 18' is roughly equidistant from two base stations 16. This is the maximum distance over which communications need to take place in that general vicinity. Unless coding rates and/or modulation orders are adjusted to communicate less data, a greater amount of power must be used in this situation in both forward and reverse channels to propagate a communication signal between a selected base station 16 and far access terminal 18'. This greater amount of power in the forward and reverse channels causes more background interference that affects all communications taking place within communication system 10 in the vicinity.

In accordance with a preferred embodiment of the present invention, communication system 10 is compatible with legacy EV-DO equipment as well as current and, desirably, future EV-DO equipment. In other words, communication system 10 desirably includes in its characteristics and capabilities those features that are substantially in compliance with the various revisions of past, present, and future EV-DO communication standards. One of these characteristics is the use of direct sequence spread spectrum techniques. Thus, in order to distinguish between competing signals that may otherwise interfere with each other, communications with neighboring base stations 16 desirably use orthogonal spreading codes in a manner well known by those skilled in the art. That way, communications with far access terminal 18' merely increase the noise floor somewhat for other nearby communications but do not fatally interfere.

In comparison to far access terminal 18', a near access terminal 18" may be located close to one specific base station 16 and therefore most likely at a considerable distance from the next closest base station 16. Communications over both forward and reverse channels may, in accordance with current and/or future versions of the EV-DO standards, take place between near access terminal 18" and that base station 16 at a much lower power level due to the shorter distance the signal needs to propagate. This arrangement, with some channels being transmitted at higher power levels and other channels being transmitted at lower power levels, leads to an improvement in overall link capacity compared to transmitting at equal power over all channels.

Power levels may be permitted to vary considerably for communications between a given base station 16 at one end of communication links and near and far access terminals 18' and 18" on other ends of the communication links. The generous separation between adjacent frequency channels, as shown in the prior art frequency allocation chart depicted in FIG. 1, accommodates this considerable power variation. When the peak in one channel is considerably attenuated relative to the peak in an adjacent channel, the lower-amplitude, out-of-band tails from the high-power channel might otherwise overwhelm and interfere with the low-power channel.

But it is believed that this near-far challenge is less serious than suggested by the conventional wisdom, and will become even less of a factor in future communication system configurations. As cell sizes shrink, the difference between power levels for near and far access terminals 18" and 18' likewise shrinks. And, as users migrate to newer revisions of EV-DO standards, they operate on more EV-DO channels in parallel. All channels that are consumed by a single connection between a base station 16 and access terminal 18 should then be at roughly the same power level because they all propagate roughly the same distance over roughly the same path. Instead of communicating simultaneously over adjacent channels for a given duration to a far access terminal 18' at a high power level and to a near access terminal 18" at a low power level, an increasing number of communications will take place at one-half the given duration over both adjacent channels at a high power level to far access terminal 18' and for one-half the given duration over both adjacent channels at a lower power level to near access terminal 18" to accomplish the same thing. The opportunities for vast differences in power levels between adjacent channels are limited and should become even more so in the future.

Figure 3:
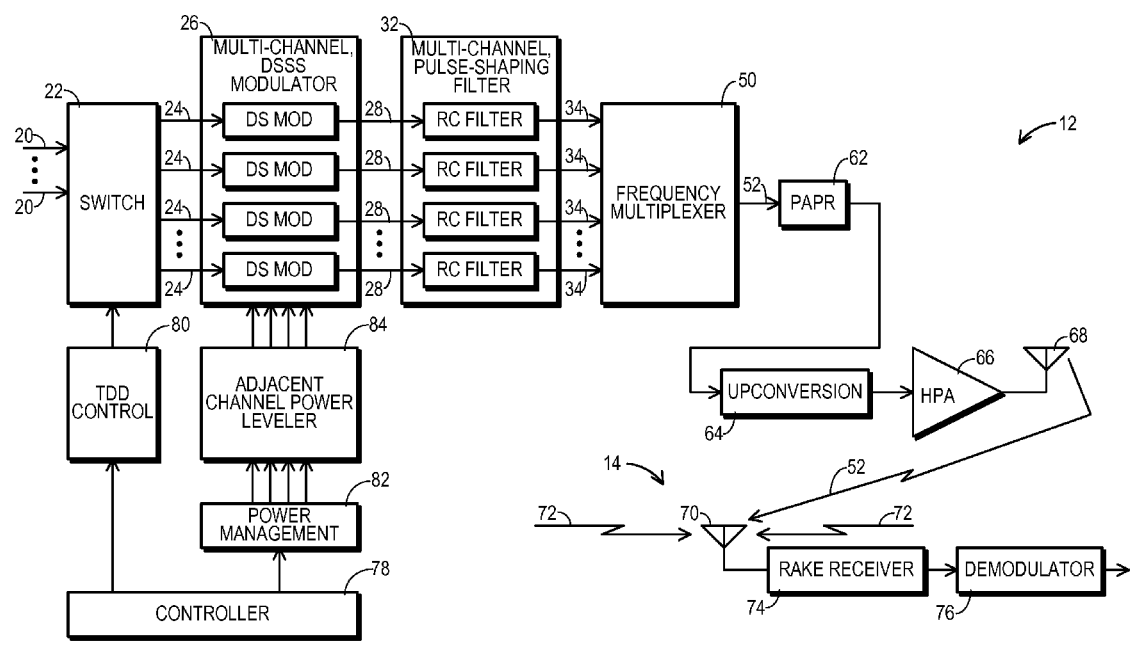
FIG. 3 shows a block diagram of a direct sequence spread spectrum (DSSS) transmitter that may be used in either a base station or an access terminal and that is configured in accordance with the teaching of one embodiment of the present invention.

FIG. 3 shows a block diagram of a direct sequence spread spectrum (DSSS) transmitter 12 that may be used in either a base station 16 or an access terminal 18 and that is configured in accordance with the teaching of one embodiment of the present invention. FIG. 3 also shows a simplified block-diagrammatic view of a receiver 14 that may be used in the other of a base station 16 and access terminal 18.

Transmitter 12 is presented with one or more streams of digital symbols 20. Symbols 20 may represent any type of fixed- or variable-rate data, and symbols 20 may be provided in correspondence with any rate supported by transmitter 12. Symbols 20 may have received some degree of forward error correction (FEC) encoding and may have been digitally modulated, such as with a suitable PASK, QAM, PSK, QPSK, binary, or other digital modulation technique.

Symbols 20 are presented to a switching section 22. Switching section 22 maps incoming symbols 20 into a number "N" of symbol streams 24. The number N is an integer greater than one and preferably greater than three in the preferred embodiments. The number N also represents the number of EV-DO channels supported by transmitter 12. In the preferred embodiments, four EV-DO channels may be supported and confined within each 5 MHz of contiguous bandwidth that has been allocated by regulatory agencies for use by transmitter 12 and like devices. Accordingly, the embodiment specifically depicted in FIG. 3 supports four EV-DO channels for use in 5 MHz of contiguous allocated bandwidth.

Those skilled in the art will appreciate that the features discussed herein may be easily duplicated and extended as needed to increase the number N of EV-DO channels so that eight EV-DO channels may be confined and operated within a 10 MHz contiguous allocated bandwidth, 12 EV-DO channels may be confined and operated within a 15 MHz allocated contiguous bandwidth, or 16 EV-DO channels may be confined and operated within in a 20 MHz contiguous allocated bandwidth. And, transmitter 12 may likewise support a larger non-contiguous region of spectrum by noting that the larger non-contiguous region includes smaller contiguous regions. Thus, eight EV-DO channels may be confined and operated within a 10 MHz non-contiguous allocated bandwidth which includes two separated 5 MHz contiguous regions, 12 EV-DO channels may be confined and operated within a 15 MHz allocated non-contiguous bandwidth that includes one or three separated 5 MHz contiguous regions, and the like. Generally, the allocated bandwidth within which communication system 10 confines N EV-DO channels is an integral multiple of 5 MHz.

While FIG. 3 depicts N symbol streams 24 as being provided over N separate paths, those skilled in the art will appreciate that the N symbol streams 24 may alternatively be multiplexed together over a single path.

Symbol streams 24 are routed to a multi-channel, DSSS modulator 26. Each of symbol streams 24 is modulated by a spreading code in a manner well understood by those skilled in the art. The spreading code is desirably selected for the base station 16 (FIG. 1) where transmitter 12 is located or to which transmitter 12 is transmitting to be orthogonal with spreading codes used by other base stations 16. The application of the spreading code transforms the N symbol streams 24 into N corresponding DSSS chip streams 28. Each DSSS chip stream 28 is characterized by a chip period $C_\tau$ consistent with the EV-DO standards, i.e., approximately 0.8138 microseconds, which also results in a chip rate of approximately 1.2288 mcps.

Figure 4:
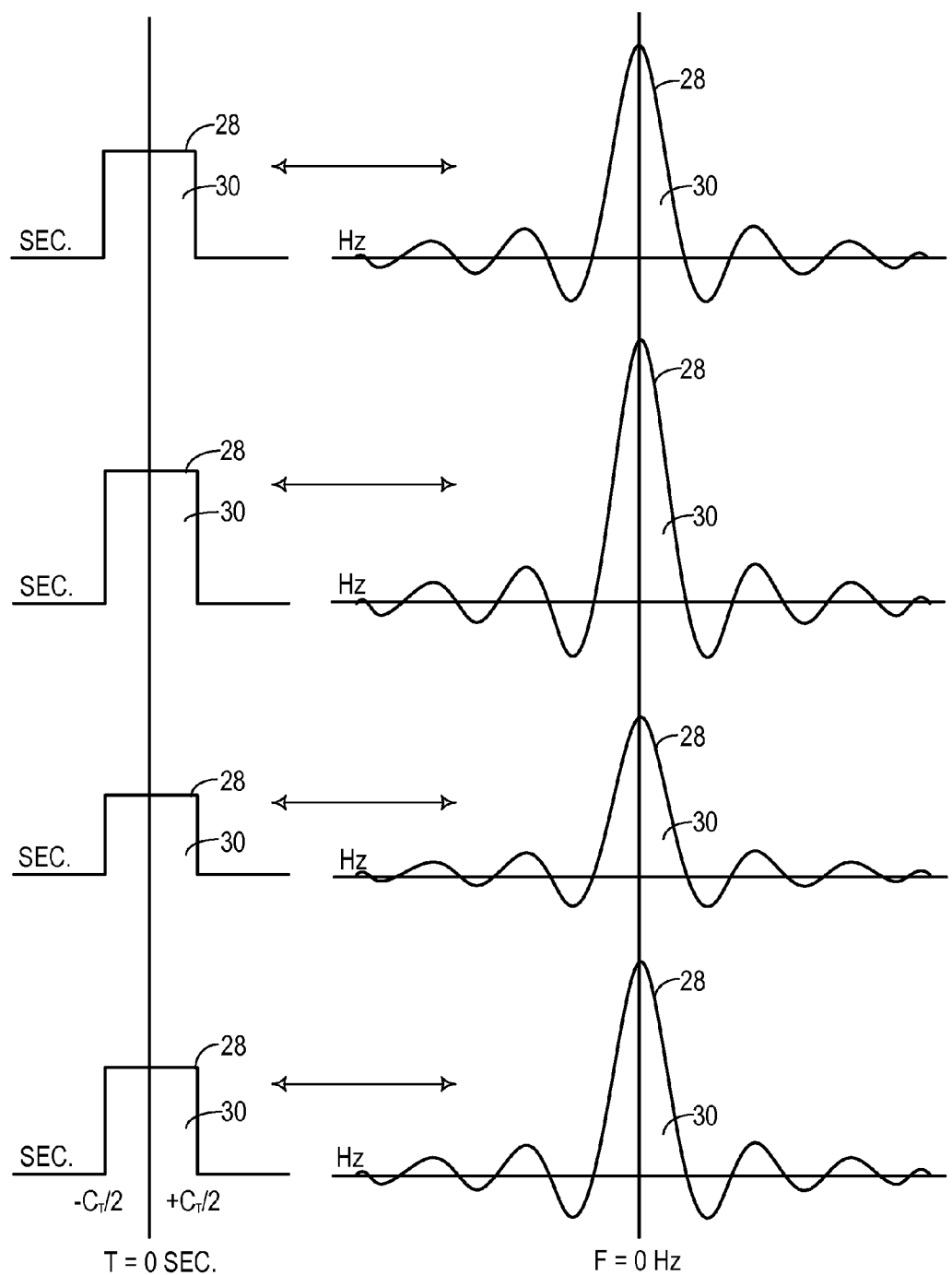
FIG. 4 shows time and frequency domain representations of four isolated chips that appear substantially simultaneously in four different DSSS chip streams in the transmitter depicted in FIG. 3.

FIG. 4 shows time and frequency domain representations of four isolated chips 30 that appear substantially simultaneously at an instant in time referred to as T=0 in four different DSSS chip streams 28. In preceding and subsequent chip periods other chips 30, different in complex magnitude and phase but otherwise like those depicted in FIG. 4, will be presented in DSS chip streams 28. In FIG. 4, chips 30 are depicted in the time domain as rectangular pulses. In general, chips 30 are complex values that exhibit magnitudes and phases that differ from each other. In the frequency domain, chips 30 appear as sinc functions. On one hand, the use of a rectangular-shaped chip 30 in the time domain is desirable because its amplitude, which conveys data, is held for a substantial duration. This holding of the amplitude eases the job in receiver 14 of sampling at proper instants. But, as shown in the frequency domain representation, the sinc function associated with this shape theoretically occupies an infinite amount of bandwidth. Those skilled in the art will appreciate that chips 30 should be transformed into a form that minimizes the amount of required bandwidth in order to be usable in a real world communication system.

Referring back to FIG. 3, the N DSSS chip streams 28 from multi-channel DSSS modulator 26 are provided to a multi-channel, pulse shaping filter 32. Multi-channel, pulse shaping filter 32 includes one pulse-shaping filter for each DSSS chip stream 28. The N DSSS chip streams 28 are transformed into N filtered DSSS chip streams 34. Pulse-shaping filters are well known in the art, although they may be variously referred to as shaping filters, Nyquist filters, raised cosine (RC) filters, square root raised cosine filters, and the like. Multi-channel pulse shaping filter 32 transforms the rectangular time-domain, sinc frequency-domain chips 30 (FIG. 4) into a form more suitable for use by communication system 10.

Figure 5:
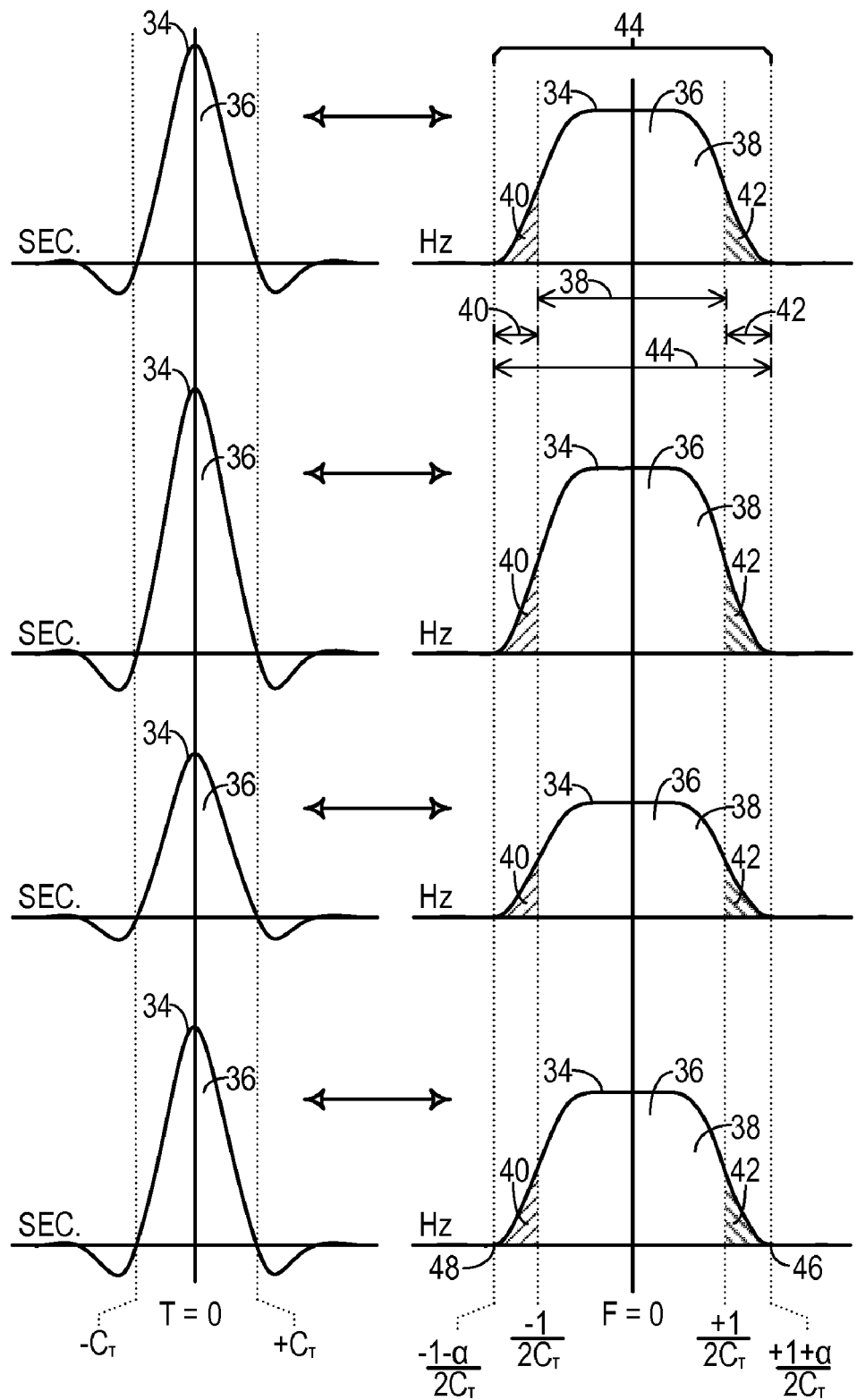
FIG. 5 shows time and frequency domain representations of four isolated chips that appear substantially simultaneously in four different filtered DSSS chip streams in the transmitter depicted in FIG. 3.

FIG. 5 shows time and frequency domain representations of four isolated filtered chips 36 that appear substantially simultaneously at an instant in time referred to as T=0 in four different filtered DSSS chip streams 34. It is the job of pulse shaping filter 32 to transform chips 30 (FIG. 3) into filtered chips 36. The shape of filtered chips 36 resembles a damped sinc function in the time domain, and a relaxed rectangular shape in the frequency domain. In the time domain, the energy from each chip 30 is spread in time over many chip periods $C_\tau$, with a maximum amplitude occurring at T=0 and with zero crossings occurring at integral multiples of the chip period $C_\tau$ displaced before and after T=0. The width of filtered chip 36 between the first zero crossings before and after T=0 is desirably double the width of chip 30 (FIG. 4). When a receiver 14 is appropriately synchronized to sample at T=0, the zero crossings of earlier-occurring and later-occurring filtered chips 36 theoretically cause those filtered chips 36 to exert no influence on the T=0 sample. This shape reduces the bandwidth requirements of for filtered chips 36 compared to the bandwidth requirements of chips 30 while reducing intersymbol interference (ISI).

In the frequency domain, the resulting spectrum of each filtered chip 36 includes three components. Centrally, a minimum-bandwidth channel 38 extends for the minimum theoretical bandwidth through which chips with a chip period of $C_\tau$ may be transmitted. Minimum-bandwidth channel 38 is $1/C_\tau$, which equals approximately 1.2288 MHz for an EV-DO channel. The maximum spectral amplitude response is provided in the central region of minimum-bandwidth channel 38. The theoretical minimum bandwidth channel 38 would result if filter 32 produced a pure sinc function for filtered chip 36, which would likewise result in vertical walls at the edges of the minimum-bandwidth channel 38.

The resulting spectrum of each filtered chip 36 also includes a lower rolloff band 40 beneath minimum-bandwidth channel 38 and an upper rolloff band 42 above minimum-bandwidth channel 38. Collectively, lower rolloff band 40, minimum-bandwidth channel 38, and upper rolloff band 42 form an excess-bandwidth channel 44. The energy of each filtered chip 36 is distributed through excess-bandwidth channel 44.

An excess-bandwidth factor $\alpha$, which is also called a rolloff factor, identifies the factor by which excess-bandwidth channel 44 exceeds minimum-channel bandwidth channel 38. In theory, excess-bandwidth factor $\alpha$ may exhibit a value in the range of 0 to 1. If excess-bandwidth factor $\alpha=0$, then excess-bandwidth channel 44 equals minimum-channel bandwidth channel 38. But an excess-bandwidth channel 44 that equals minimum-bandwidth channel 38 is neither realizable using real world components nor is it desired. If such a small bandwidth were actually used, then receiver 14 would need to experience no sampling jitter and be perfectly synchronized to the proper sampling instants in order to successfully recover data. This is too stringent of a constraint on receiver 14.

Accordingly, it is advantageous to utilize excess bandwidth over the minimum required in theory so that receiver 14 may exhibit robust performance. But it is also advantageous that the excess bandwidth be no larger than necessary for receiver 14 to do a reasonable job because any more excess bandwidth than necessary would result in an inefficient use of spectrum. Lower and upper rolloff bands 40 and 42 represent the excess bandwidth, and the amount that is consistent with EV-DO standards represents a balance between these two competing goals. Typically, pulse-shaping filters compatible with EV-DO channels are designed with an excess-bandwidth factor $\alpha<0.25$, and most often around $\alpha=0.22$.

Multi-channel, pulse-shaping filter 32 desirably implements an excess-bandwidth factor $\alpha<0.25$, and preferably an excess-bandwidth factor $\alpha\leqq0.22$. These values for excess-bandwidth factor $\alpha$ maintain compatibility with EV-DO standards and legacy EV-DO equipment. With an excess-bandwidth factor $\alpha<0.25$, each rolloff band 40 and 42 is less than 0.125 times minimum-bandwidth channel 38. With an excess-bandwidth factor $\alpha=0.22$, each rolloff band 40 and 42 is less than 0.11 times minimum-bandwidth channel 38, and with an excess-bandwidth factor $\alpha<0.22$, each rolloff band 40 and 42 is less than 0.11 times minimum-bandwidth channel 38.

Figure 1:
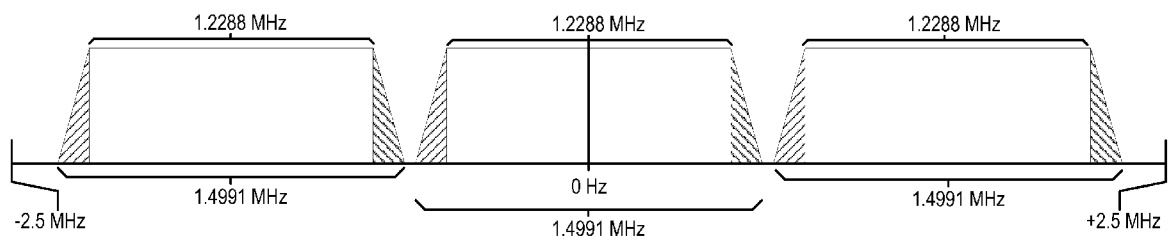
FIG. 1 shows a frequency allocation chart indicating a prior art technique for operating three EV-DO channels in a contiguous 5 MHz allocated bandwidth.

The ability to design pulse-shaping filters within multi-channel, pulse-shaping filter 32 that produce an excellent realization of the filtered chips 36 depicted in FIG. 5 is within the capabilities of those skilled in the art. FIG. 1 depicts a prior art utilization of EV-DO channels in a contiguous 5 MHz allocated bandwidth. In that prior art utilization, spectrum is used inefficiently, consequently it is of little importance whether sloppily designed $\alpha=0.22$, pulse-shaping filters are used. In such conventional designs, at an upper edge 46 of upper rolloff band 42 and at a lower edge 48 of lower rolloff band 40, pulse-shaping filters might achieve only 30 dB of attenuation relative to the response in the central region of minimum-bandwidth channel 38. This is entirely satisfactory for the prior art EV-DO channel utilization depicted in FIG. 1.

But in accordance with one embodiment of the present invention, four EV-DO channels are operated within each 5 MHz of contiguous allocated bandwidth. Less noise will be present to interfere with adjacent channels if multi-channel, pulse-shaping filter 32 achieves better performance than the typical pulse-shaping filters. Desirably, in the preferred embodiments pulse-shaping filter 32 achieves a spectral magnitude at least 50 dB attenuated at upper edge 46 of upper rolloff band 42 and at lower edge 48 of lower rolloff band 40 relative to the spectral magnitude in the central region of minimum-bandwidth channel 38. And, multi-channel, pulse-shaping filter 32 is designed in the preferred embodiment so that excess-bandwidth factor $\alpha<0.22$, although $\alpha$ is desirably only slightly less than 0.22 to maintain compatibility with legacy EV-DO equipment. These improvements over the typical pulse-shaping filters result in a readily realizable filter 32 with even less energy appearing outside excess-bandwidth channel 44. Since less energy appears outside excess-bandwidth channel 44, less energy is available to interfere in adjacent channels.

Referring back to FIG. 3, the N filtered DSSS chip streams 34 generated by multi-channel, pulse-shaping filter 32 pass to a frequency multiplexer 50. Frequency multiplexer 50 frequency-shifts and combines the N excess-bandwidth channels 44 of the N filtered DSSS chip streams 34 to produce a single multi-channel signal 52. In the preferred embodiment, frequency multiplexer 50 performs its frequency-shifting operations using complex multiplication operations between the N filtered DSSS chip streams 34 and N different constant-frequency signals (not shown). The N different constant-frequency signals may be generated by synthesizers (not shown). Filtering (not shown) may be applied to remove side bands. The result of the multiplication operations is N excess-bandwidth channels 44, each with a different center frequency. Frequency multiplexer 50 also combines the N excess-bandwidth channels 44 to generate multi-channel signal 52. In the preferred embodiment, frequency multiplexer 50 is configured using digital components, but the frequency multiplexing operation may alternatively be performed using analog components.

More specifically, frequency multiplexer 50 frequency shifts the N excess-bandwidth channels 44 so as to efficiently occupy a contiguous band of allocated spectrum. In the preferred embodiments, multi-channel signal 52 is spectrally confined within the allocated bandwidth, and multi-channel signal 52 spectrally occupies less bandwidth than N times the bandwidth of a single excess-bandwidth channel 44. Desirably, four excess-bandwidth channels 44 are accommodated in each 5 MHz of allocated bandwidth.

Figure 6:
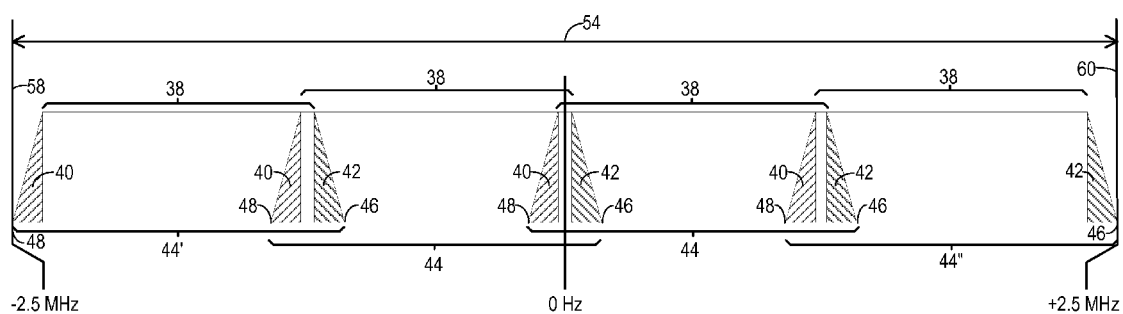
FIG. 6 shows a frequency allocation chart indicating the operation of four EV-DO channels in a contiguous 5 MHz allocated bandwidth as provided in a multi-channel signal from the transmitter depicted in FIG. 3.

FIG. 6 shows a frequency allocation chart indicating the operation of four excess-bandwidth EV-DO channels 44 in a contiguous 5 MHz allocated bandwidth 54 as provided in multi-channel signal 52. In other words, multi-channel signal 52 is specifically configured to occupy and be confined within 5 MHz when N=4. FIG. 6 depicts the contiguous 5 MHz allocated bandwidth 54 as extending from −2.5 MHz to +2.5 MHz. Subsequent signal processing frequency shifts the 5 MHz bandwidth multi-channel signal 52 to a desired RF frequency at a region of the electromagnetic spectrum that has been assigned for use by system 10. This RF region may be either licensed or unlicensed spectrum. As discussed above, allocated bandwidth 54 is not limited to being only a 5 MHz span of the electromagnetic spectrum but is desirably any integral multiple of 5 MHz, with an appropriate adjustment to the integer N.

Figure 7:
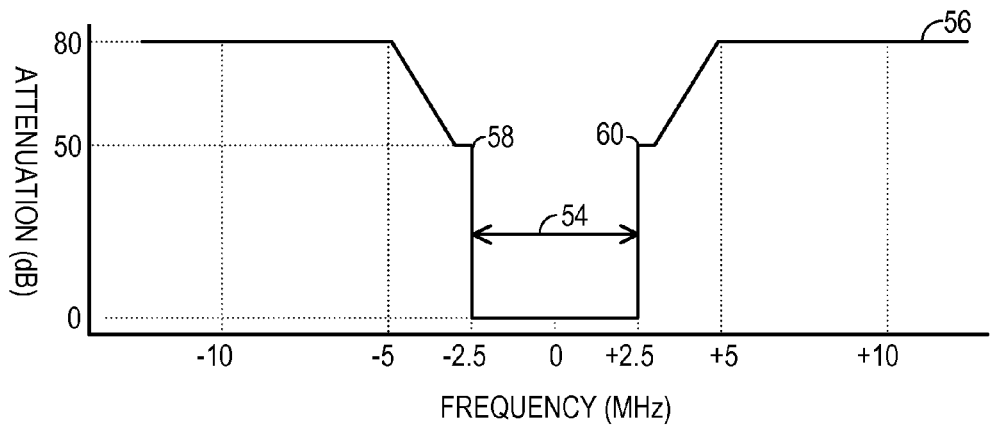
FIG. 7 shows a frequency chart of an exemplary regulatory spectral mask with which the transmitter depicted in FIG. 3 complies.

FIG. 7 shows a frequency chart of an exemplary regulatory spectral mask 56 with which transmitter 12 complies. And, the version of spectral mask 56 depicted in FIG. 7 is specifically configured for an allocated bandwidth 54 of 5 MHz. As shown in FIG. 7, spectral emissions from transmitter 12 are required by the regulatory agency that defines spectral mask 56 to be attenuated 50 dB immediately outside allocated bandwidth 54, with greater amounts of attenuation in the portions of the spectrum that are further outside allocated bandwidth 54.

Referring to FIGS. 3, 6, and 7, frequency multiplexer 50 is configured so that a lower excess-bandwidth channel 44' occupies a first or lowest range in allocated bandwidth 54 and an upper excess-bandwidth channel 44" occupies a last or highest range in allocated bandwidth 54. In particular, lower edge 48 of lower rolloff band 40 of first excess-bandwidth channel 44' may be placed precisely at a lower edge 58 of allocated bandwidth 54. And, upper edge 46 of upper rolloff band 42 of last excess-bandwidth channel 44" may be placed precisely at an upper edge 60 of allocated bandwidth 54. As discussed above, for each excess-bandwidth channel 44, pulse-shaping filter 32 desirably achieves a spectral magnitude at least 50 dB attenuated at upper edge 46 of upper rolloff band 42 and at lower edge 48 of lower rolloff band 40 relative to the spectral magnitude in the central region of minimum-bandwidth channel 38. Thus, this placement complies with spectral mask 56.

Frequency multiplexer 50 is further configured so that the other ones of excess-bandwidth channels 44, i.e., other than channels 44' and 44", are distributed throughout allocated bandwidth 54 so that the spectral overlaps between each pair of adjacent excess-bandwidth channels 44 are approximately equal. For the N=4, 5 MHz allocated bandwidth 54 example, three regions of such overlaps exist.

As a result of the configuration of frequency multiplexer 50, lower rolloff band 40 of first excess-bandwidth channel 44' and upper rolloff band 42 of last excess-bandwidth channel 44" reside inside allocated bandwidth 54 but outside all of minimum-bandwidth channels 38. On the other hand, all rolloff bands 40 and 42 other than these two rolloff bands predominately reside within adjacent ones of minimum-bandwidth channels 38. For purposes of the present invention, rolloff bands 40 and 42 are considered to reside predominately within adjacent ones of minimum-bandwidth channels 38 when at least 50% of their spectral range is shared with the spectral range of the adjacent minimum-bandwidth channel 38.

In other words, frequency multiplexer 50 is configured so that N filtered DSSS chip streams 34 spectrally occupy N minimum bandwidth channels 38 and 2N rolloff bands 40 and 42. Two of the 2N rolloff bands 40 and 42 spectrally reside inside allocated bandwidth 54 and outside all of the N minimum-bandwidth channels 38. At least 50% of all spectrum occupied by 2N−2 of the 2N rolloff bands 40 and 42 spectrally resides within the N minimum-channel bandwidths 38. In the example specifically depicted in FIGS. 3 and 6 where N=4 and allocated bandwidth 54 is 5 MHz, 100% of 2N−2 of the rolloff bands 40 and 42 reside within adjacent minimum-channel bandwidths 38, but this result need not apply for all embodiments of the present invention.

As a result of the configuration of frequency multiplexer 50, excess-bandwidth channels 44 are not placed at orthogonal frequencies relative to one another. Placement at orthogonal frequencies is a constraint of OFDM communication systems that is neither observed nor desired in communication system 10. By avoiding the orthogonal frequency placement requirement, communication system 10 is able to maintain compatibility with EV-DO standards and a vast population of legacy EV-DO equipment.

The co-channel interference caused by energy from one excess-bandwidth channel 44 being intentionally transmitted within an adjacent excess-bandwidth channel 44 is unwanted and desirably held to a minimum. But this co-channel interference causes far less of a performance detriment than is gained by having one additional excess-bandwidth channel 44 for each 5 MHz of allocated bandwidth 54 than prior art communication systems that comply with EV-DO standards.

The intentional co-channel interference of communication system 10 is generally at a low power level and occupies only a small fraction of each excess-bandwidth channel 44. After de-spreading in receivers 14, its influence is substantially reduced through the de-spreading operation. And, the interfering adjacent channel power is substantially uncorrelated with and less dominant than other forms of interfering power. The other forms of interfering power result from thermal noise, communications taking place at other base stations 16, and the like. These other forms of interfering power typically occupy the entire excess-bandwidth channel 44 and are not as greatly reduced through de-spreading. The total power of uncorrelated signals typically combine in a root-sum-of-squares (RSS) fashion. Accordingly, the most dominant forms of interference exert an exaggerated influence while the less dominant forms exert an even further reduced influence. As a result of these factors, the intentional co-channel interference of communication system 10 exerts only an insubstantial or trivial detrimental influence on system performance so long as adjacent channels are transmitted at power levels that do not diverge by too great a power level.

Referring back to FIG. 3, multi-channel signal 52 passes from frequency multiplexer 50 to a peak-to-average power reduction (PAPR) section 62 in which peaks of multi-channel signal 52 are reduced so as not to exceed the average signal level by too great an amount. PAPR section 62 introduces distortion that represents yet another form of competing noise power in receiver 14. Other types of processing, such as predistortion to compensate for linear and non-linear distortions of downstream components, may also take place. In the preferred embodiment, multi-channel signal 52 then is converted into an analog form (not shown) and eventually routed to an upconversion section 64, where multi-channel signal 52 is frequency shifted to an assigned RF frequency. Then, multi-channel signal 52, now in RF form, is routed through a band-pass filter (not shown) to a high-power amplifier (HPA) 66. After amplification, multi-channel signal 52 then passes to an antenna 68, where it is broadcast from transmitter 12.

The RF form of multi-channel signal 52 is received at an antenna 70 of receiver 14 along with other competing signals 72. The other competing signals include thermal noise and signals from sources other than transmitter 12. These other sources may be signals from other transmitters 12 within communication system 10 transmitting in the same allocated bandwidth at the same assigned RF frequency but using other spreading codes. As discussed above, the other competing signals 72 form the noise floor over which the intended multi-channel signal 52 is to be distinguished. And, the co-channel interference which results from having some of rolloff bands 40 and 42 predominately occupy adjacent minimum-bandwidth channels 38 contributes very little to this noise floor.

Signals received at antenna 70 in receiver 14 are desirably routed to a rake receiver 74 configured to be compatible with EV-DO standards. Rake receiver 74 temporally aligns the received signal and adds several of the largest magnitude multipath components together, then sends it to a demodulator 76 where the data presented in symbols 20 are recovered in a manner compatible with EV-DO standards. Accordingly, multi-channel signal 52 in RF form is compatible with EV-DO standards so that a population of legacy EV-DO receivers 14 may successfully receive and demodulate it.

Referring back to transmitter 12 in FIG. 3, a controller 78 may be configured in a conventional manner to accomplish power management and time-division duplexing (TDD), or modified as described herein. In accordance with one embodiment, controller 78 and/or a TDD control section 80 are configured to implement a TDD transmission scheme. In furtherance of this scheme, an output from TDD control section 80 couples to switch 22 to control how symbols 20 are routed into symbol streams 24.

And, a power management section 82 or power management section 82 in cooperation with an adjacent channel power leveler 84 and controller 78 may be configured to implement power management for excess-bandwidth channels 44. In furtherance of the power management feature, adjacent channel power leveler 84 may couple to any of switch 22, multi-channel DSSS modulator 26, multi-channel pulse shaping filter 32, or frequency multiplexer 50. FIG. 3 specifically shows adjacent channel power leveler 84 coupled to multi-channel DSSS modulator 26. The power management feature controls the power levels at which excess-bandwidth channels 44 appear in multi-channel signal 52. TDD control section 80, power management section 82, and adjacent channel power leveler 84 may be separate items as depicted in FIG. 3 or included in controller 78.

Receiver 14 may send messages over a reverse channel (not shown) to transmitter 12 informing transmitter 12 of various parameters that characterize receiver 14 and the current state in which receiver 14 finds itself from time to time. One of these messages may inform transmitter 12 of the maximum number of EV-DO channels the receiver 14 is capable of simultaneously receiving. In response, TDD control section 80 is desirably configured to make adjustments that route symbols 20 destined for that receiver 14 over that number of symbol streams 24. In other words, communications between transmitter 12 and receiver 14 desirably take place over the maximum number of excess-bandwidth channels 44 that transmitter 12 and receiver 14 can mutually accommodate. Power management is also adjusted so that each of these excess-bandwidth channels 44 exhibits approximately the same power level.

Figure 8:
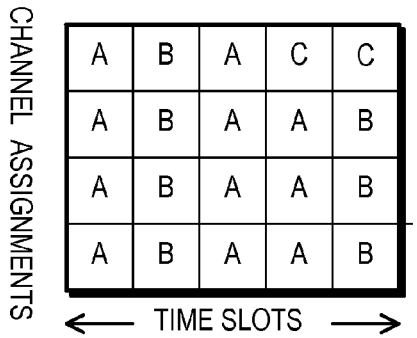
FIG. 8 shows a timing chart that indicates an exemplary allocation of time and EV-DO channels to different access terminals by a base station.

FIG. 8 shows a timing chart that indicates an exemplary allocation of time and EV-DO channels to different access terminals 18 by a base station 16. The FIG. 8 example shows that transmitter 12 transmits to a receiver 14, hereinafter referred to as receiver A, in a first time slot over all of N=4 excess-bandwidth channels 44, to a receiver B over all of the four excess-bandwidth channels 44 in a second time slot, and to receiver A again over all of the four excess-bandwidth channels 44 in a third time slot. In a fourth time slot, transmitter 12 transmits to receiver A in three of the four excess-bandwidth channels 44 and to a receiver C in one of the excess-bandwidth channels 44. The FIG. 8 example then shows that transmitter 12 uses one excess-bandwidth channels 44 for receiver C in a fifth time slot and the remaining three excess-bandwidth channels 44 for receiver B in the fifth time slot. Of course, FIG. 8 depicts only one of a large number of different allocation schemes that may be used to allocate any number of excess-bandwidth channels 44 over any number of time slots. In this example, receivers A and B are each capable of simultaneously receiving over all four of excess-bandwidth channels 44, but receiver C is capable of receiving over only one of excess-bandwidth channels 44 in any given time slot.

As shown in FIG. 8, The TDD scheme implemented by TDD control section 80, to the maximum extent possible, causes transmitter 12 to transmit to only one receiver 14 at a time. When transmitter 12 is obliged to transmit to more than one receiver 14 at a time, the number of receivers 14 is desirably held to as low a number as possible. The TDD scheme implemented by TDD control section 80 reduces the likelihood that adjacent excess-bandwidth channels 44 are transmitted at widely divergent power levels because different excess-bandwidth channels 44 intended for the same receiver 14 tend to be transmitted at about the same power level.

Adjacent channel power leveler 84 furthers the ability of transmitter 12 to avoid transmitting over adjacent excess-bandwidth channels 44 at widely divergent power levels. In accordance with conventional EV-DO practices, controller 78, power management section 82, and/or adjacent channel power leveler 84 may evaluate data rate control (DRC) messages transmitted from an access terminal 18 over a reverse channel (not shown). The DRC messages may provide data determined in response to channel-to-interference ratios measured at receiver 14. In response to DRC messages, power management section 82 may provide one or more signals or messages that establishes the power levels for each excess-bandwidth channel 44. Power levels may be adjusted at any of switch 22, multi-channel DSSS modulator 26, multi-channel pulse shaping filter 32, or frequency multiplexer 50.

Figure 9:
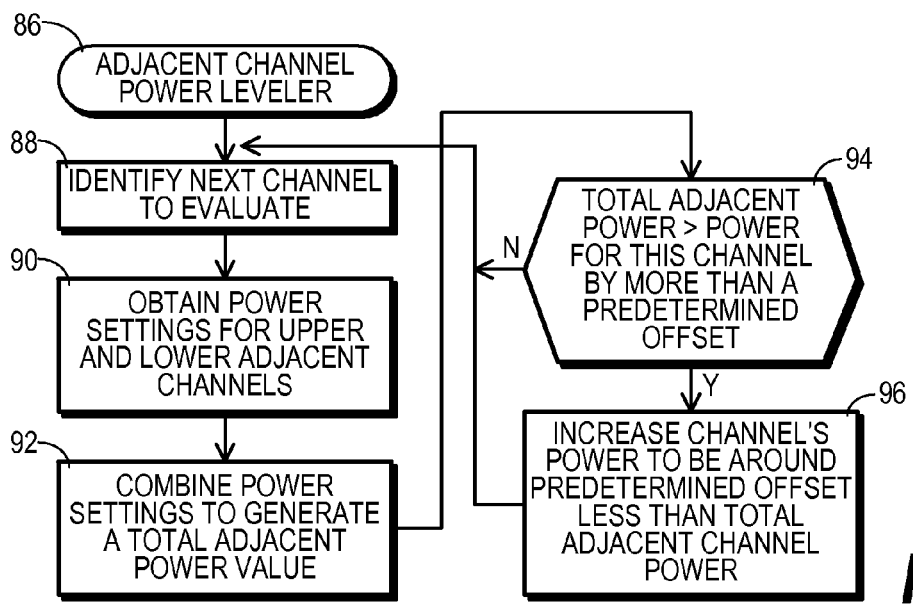
FIG. 9 shows a flow chart of an exemplary process performed by an adjacent channel power leveler from the transmitter depicted in FIG. 3.

FIG. 9 shows a flow chart of an exemplary process 86 performed by adjacent channel power leveler 84. Process 86 causes adjacent channel power leveler 84 to intercept and occasionally further adjust the power level settings otherwise commanded by power management section 82. Process 96 may operate cooperatively with other conventional processes that adjust coding rates and/or modulation orders in response to messages received from access terminals 18.

In a task 88, process 86 identifies a next one of the N excess-bandwidth channels 44 to evaluate. Then, in a task 90 obtains the power level settings from power management section 82 for the excess-bandwidth channels 44 that appear above and below the identified excess-bandwidth channel 44 in multi-channel signal 52. If the identified excess bandwidth channel 44 is located at lower edge 58 or upper edge 60 (FIG. 6) of allocated bandwidth 54, then only one power level setting is obtained.

After task 90, a task 92 combines the upper and lower power level settings obtained in task 90 to generate a total adjacent channel power value. If the identified excess bandwidth channel 44 is located at lower edge 58 or upper edge 60 of allocated bandwidth 54, then no combination is needed to generate the total value. Following task 92, a query task 94 determines whether the total adjacent channel power is greater than the power for the identified channel 44 by more than a predetermined offset.

The predetermined offset is determined during the design of transmitter 12 and is a function of the performance of multi-channel pulse-shaping filter 32 and of the percent of overlap or bandjamming between adjacent channels. The better the performance of multi-channel pulse-shaping filter 32, and the less overlap between adjacent channels 44, the greater that predetermined offset will be. It is anticipated that in a typical application of communication system 10, an power offset of up to 12 dB may be tolerated between adjacent excess-bandwidth channels 44. But, those skilled in the art will appreciate that these offsets are dependent upon parameters that can vary from system 10 to system 10.

When query task 94 determines that the total adjacent channel power is not greater than the power for the identified channel 44 by more than the predetermined offset, program control loops back to task 88 to evaluate another channel 44. When query task 94 determines that the total adjacent channel power is greater than the power for the identified channel 44 by at least the predetermined offset, a task 96 is performed. Task 96 increases the identified channel's power to be below that of the total adjacent channel power by about the predetermined offset. Task 96 may also send a message to the access terminal 18 associated with the identified channel 44 to do likewise in its transmissions over the reverse channel. After task 96 program control loops back to task 88 to evaluate another channel 44.

Accordingly, process 96 causes adjacent channel power leveler 84 to maintain power levels in adjacent excess-bandwidth channels 44 to be within a predetermined range of each other. Very few consequences result from increasing the power levels of the weakest ones of excess-bandwidth channels 44 when needed. The noise floor for communications taking place with nearby base stations 16 (FIG. 1) may be slightly increased, but the increase is likely to be no more than an insignificant amount.

Figure 10:
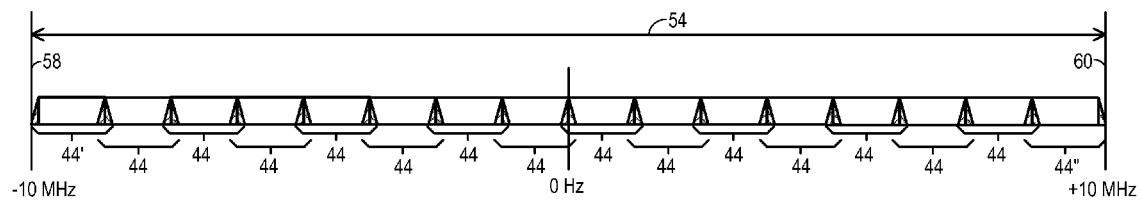
FIG. 10 shows a frequency allocation chart indicating the operation of 16 EV-DO channels in a contiguous 20 MHz allocated bandwidth as provided in accordance with one embodiment of the present invention.

While the above-description has focused on an exemplary implementation of a communication system 10 and a transmitter 12 in which N=4 channels are assigned in an allocated bandwidth 54 of 5 MHz, alternative implementations are readily available. One such alternative implementation is depicted in FIG. 10. FIG. 10 shows a frequency allocation chart indicating the operation of N=16, excess-bandwidth, EV-DO channels 44 in a contiguous 20 MHz allocated bandwidth 54. The 20 MHz allocated bandwidth is an integral multiple of 5 MHz, and four excess-bandwidth channels 44 are provided for each 5 MHz of allocated bandwidth 54. Other alternative implementations are also readily available.

In summary, in at least one embodiment the present invention provides an improved bandjamming multi-channel direct sequence spread spectrum (DSSS) transmitter and method. In at least one embodiment the present invention a transmitter places a number N of EV-DO channels in a bandwidth of a size commonly allocated by a regulatory agency, where the number N is selected to efficiently utilize the allocated bandwidth. And, in at least one embodiment of the present invention EV-DO channels are placed in an allocated bandwidth so as to overlap one another, and DSSS principles are applied to minimize the resulting co-channel interference.

Although the preferred embodiments of the invention have been illustrated and described in detail, it will be readily apparent to those skilled in the art that various modifications may be made therein without departing from the spirit of the invention or from the scope of the appended claims. These and other modifications and adaptations which are obvious to those skilled in the art are to be included within the scope of the present invention.

What is claimed is:

1. A multi-channel, direct sequence spread spectrum (DSSS) transmitter configured to efficiently utilize a contiguous region of spectrum having an allocated bandwidth, said transmitter comprising:
   a multi-channel DSSS modulator configured to generate a plurality of DSSS chip streams;
   a multi-channel, pulse-shaping filter configured to respectively transform said plurality of DSSS chip streams into a plurality of filtered DSSS chip streams, wherein each of said filtered DSSS chip streams spectrally occupies a minimum-bandwidth channel, an upper rolloff band, and a lower rolloff band; and
   a frequency multiplexer configured to respectively up-convert and combine said plurality of filtered DSSS chip streams into a multi-channel signal confined within said allocated bandwidth so that:
      a lower rolloff band for a first one of said minimum-bandwidth channels and an upper rolloff band for a last one of said minimum-bandwidth channels resides inside said allocated bandwidth and outside all of said minimum-bandwidth channels; and
      all rolloff bands other than said lower rolloff band for said first minimum-bandwidth channel and said upper rolloff band for said last minimum-bandwidth channel predominately reside within adjacent ones of said minimum-bandwidth channels.

2. A transmitter as claimed in claim 1 wherein:
   said DSSS modulator is configured so that each of said plurality of DSSS chip streams exhibits a chip period $C_\tau$;
   said multi-channel, pulse-shaping filter is configured so that each of said plurality of filtered DSSS chip streams exhibits a minimum-bandwidth channel of $1/C_\tau$; and
   said multi-channel, pulse-shaping filter is configured so that each of said rolloff bands is less than 0.125 times said minimum-bandwidth channel.

3. A transmitter as claimed in claim 2 wherein said DSSS modulator is configured so that said chip period $C_\tau$ for each of said plurality of DSSS chip streams is approximately 0.8138 microseconds.

4. A transmitter as claimed in claim 3 wherein said allocated bandwidth is an integral multiple of 5 MHz.

5. A transmitter as claimed in claim 2 wherein said frequency multiplexer is configured so that said plurality of filtered DSSS chip streams are not placed at orthogonal frequencies relative to one another in said multi-channel signal.

6. A transmitter as claimed in claim 2 wherein said multi-channel, pulse-shaping filter is configured so that each of said rolloff bands is less than 0.11 times said minimum-bandwidth channel.

7. A transmitter as claimed in claim 2 wherein:
   said multi-channel, pulse-shaping filter is configured so that, for each filtered DSSS chip stream, a spectral magnitude at upper and lower edges of said upper and lower rolloff bands, respectively, is attenuated at least 50 dB relative to a spectral magnitude in a central region of said minimum-bandwidth channel.

8. A transmitter as claimed in claim 2 wherein said frequency multiplexer is configured to place four of said filtered DSSS chip streams in every 5 MHz of allocated bandwidth.

9. A transmitter as claimed in claim 1 wherein:
for each of said filtered DSSS chip streams, said minimum-bandwidth channel, said upper rolloff band, and said lower rolloff band form an excess-bandwidth channel; and
said transmitter additionally comprises an adjacent channel power leveler coupled to one of said DSSS modulator, said pulse-shaping filter, and said frequency multiplexer, said adjacent channel power leveler being configured to maintain power levels in adjacent ones of said excess-bandwidth channels within a predetermined range of each other.

10. A transmitter as claimed in claim 9 wherein said adjacent channel power leveler is configured to increase power in any excess-bandwidth channel for which an adjacent excess-bandwidth channel exhibits a power level more than a predetermined amount greater than a power level exhibited in said excess-bandwidth channel.

11. A transmitter as claimed in claim 1 wherein:
for each of said filtered DSSS chip streams, said lower rolloff band, said minimum-bandwidth channel, and said upper rolloff band form an excess-bandwidth channel; and
said transmitter additionally comprises a time-division duplex (TDD) controller configured to identify a number of said excess-bandwidth channels that a receiver is capable of receiving, of switching data destined for said receiver into said number of excess-bandwidth channels, and setting power levels for each of said number of excess-bandwidth channels to be approximately equal to one another.

12. A method of operating a multi-channel, direct sequence spread spectrum (DSSS) transmitter configured to efficiently utilize a contiguous region of spectrum having an allocated bandwidth, said method comprising:
generating a plurality of DSSS chip streams;
forming a plurality of filtered DSSS chip streams in response to said plurality of DSS data streams, wherein each of said filtered DSSS chip streams spectrally occupies a minimum-bandwidth channel, an upper rolloff band, and a lower rolloff band; and
frequency shifting and combining said plurality of filtered DSSS chip streams into a multi-channel signal confined within said allocated bandwidth so that:
a lower rolloff band for a first one of said filtered DSSS chip streams and an upper rolloff band for a last one of said filtered DSSS chip streams reside inside said allocated bandwidth and outside all of said channels; and
at least 50 percent of all spectrum occupied by all rolloff bands other than said lower rolloff band for said first one of said filtered DSSS chip streams and said upper rolloff band for said last one of said filtered DSSS chip streams resides within said plurality of minimum-bandwidth channels.

13. A method as claimed in claim 12 wherein:
said generating activity is configured so that each of said plurality of DSSS chip streams exhibits a chip period of approximately 0.8138 microseconds;
said forming activity forms each of said plurality of minimum-bandwidth channels to exhibit a bandwidth of approximately 1.2288 MHz; and
said forming activity is configured so that each of said rolloff bands is less than 0.11 times said minimum-bandwidth channel.

14. A method as claimed in claim 12 wherein:
said generating activity is configured so that each of said plurality of DSSS chip streams exhibits a chip period of approximately 0.8138 microseconds;
said forming activity forms each of said plurality of minimum-bandwidth channels to exhibit a bandwidth of approximately 1.2288 MHz; and
said allocated bandwidth is an integral multiple of 5 MHz.

15. A method as claimed in claim 12 wherein:
said generating activity is configured so that each of said plurality of DSSS chip streams exhibits a chip period of approximately 0.8138 microseconds;
said forming activity forms each of said plurality of minimum-bandwidth channels to exhibit a bandwidth of approximately 1.2288 MHz; and
said frequency shifting and combining activity comprises placing four of said filtered DSSS chip streams in every 5 MHz of allocated bandwidth.

16. A method as claimed in claim 12 wherein:
for each of said filtered DSSS chip streams, said lower rolloff band, said minimum-bandwidth channel, and said upper rolloff band form an excess-bandwidth channel; and
said method additionally comprises maintaining power levels in adjacent ones of said excess-bandwidth channels within a predetermined range of each other.

17. A method as claimed in claim 16 wherein said maintaining activity comprises increasing power in any excess-bandwidth channel for which an adjacent channel exhibits a power level more than a predetermined amount greater than a power level exhibited in said excess-bandwidth channel.

18. A method as claimed in claim 12 wherein, for each of said filtered DSSS chip streams, said lower rolloff band, said minimum-bandwidth channel, and said upper rolloff band form an excess-bandwidth channel, and said method additionally comprises:
identifying a number of said excess-bandwidth channels that a receiver is capable of receiving;
switching data destined for said receiver into said number of excess-bandwidth channels; and
setting power levels for each of said number of excess-bandwidth channels to be approximately equal to one another.

19. A multi-channel, direct sequence spread spectrum (DSSS) transmitter configured to efficiently utilize a contiguous region of spectrum having an allocated bandwidth, said transmitter comprising:
a multi-channel DSSS modulator configured to generate N DSSS chip streams, where N is an integer greater than three;
a multi-channel, pulse-shaping filter configured to respectively transform said N DSSS chip streams into N filtered DSSS chip streams, wherein said N filtered DSSS chip streams spectrally occupy N minimum-bandwidth channels and 2N rolloff bands; and
a frequency multiplexer configured to respectively up-convert and combine said N filtered DSSS chip streams into a multi-channel signal confined within said allocated bandwidth so that:

two of said 2N rolloff bands spectrally reside inside said allocated bandwidth and outside all of said N minimum-bandwidth channels; and at least 50 percent of all spectrum occupied by 2N−2 of said 2N rolloff bands spectrally resides within said N minimum-bandwidth channels.

20. A transmitter as claimed in claim 19 wherein:

said DSSS modulator is configured so that each of said N DSSS chip streams exhibits a chip period of approximately 0.8138 microseconds;

said multi-channel, pulse-shaping filter is configured so that each of said N minimum-bandwidth channels exhibits a bandwidth of approximately 1.2288 MHz; and said multi-channel, pulse-shaping filter is configured so that each of said rolloff bands is less than 0.11 times said minimum-bandwidth channel bandwidth;

said allocated bandwidth is an integral multiple of 5 MHz; and said frequency multiplexer is configured to place four of said filtered DSSS chip streams in every 5 MHz of allocated bandwidth.

* * * * *